Figure 1:
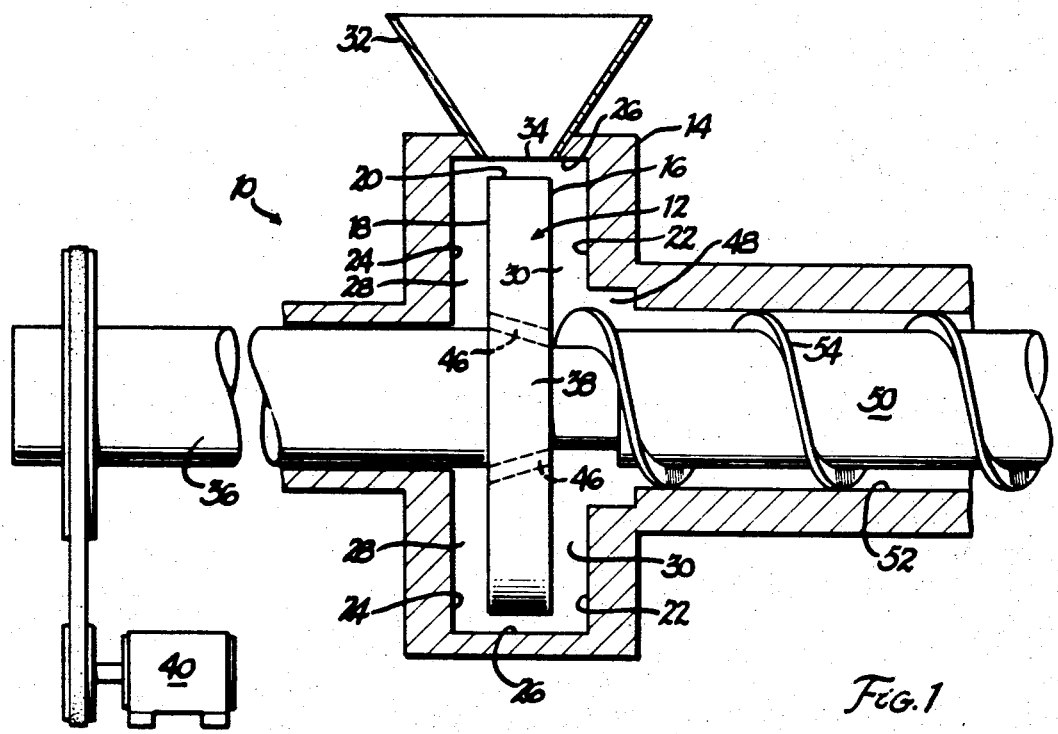

Dec. 24, 1968  J. E. HENRY  3,418,413
DUAL GAP CENTRIPETAL EXTRUDER AND METHOD OF EXTRUDING
Filed Feb. 2, 1966

Inventor
JAMES E. HENRY
By Philip M. Rice
& W. A. Schaich
ATT'YS.

United States Patent Office 3,418,413
Patented Dec. 24, 1968

3,418,413
DUAL GAP CENTRIPETAL EXTRUDER AND
METHOD OF EXTRUDING
James E. Henry, Toledo, Ohio, assignor to Owens-Illinois, Inc., a corporation of Ohio
Filed Feb. 2, 1966, Ser. No. 524,571
9 Claims. (Cl. 264—349)

This invention relates generally to an elastic melt extruder and a method of extruding plastic materials. In particular, the invention relates to a method of and apparatus for extruding plastic material through two shearing gaps using a single take-off means to advance material away from the gaps.

Elastic melt extruders are in use in industry, and their theory of operation and operating results have been reported in the literature. For background information on elastic melt extruders reference is made to an article by Bryce Maxwell and Anthony J. Scalora in "Modern Plastics" magazine of October 1959, at page 107.

Such elastic melt extruders subject thremoplastic materials to rotative shearing stresses in a melt chamber or shearing gap defined by a rotatable disc and a fixed surface closely spaced from the disc. Material is usually introduced to the shearing gap peripherally of the disc, and as the disc is rotated the material advances spirally inwardly of the disc toward its central portion. From there, the material may flow through an outlet orifice.

The output of such an extruder is limited by the capacity of a single melt chamber, particularly since a minimum gap distance must be maintained for maximum plasticizing efficiency, while merely increasing the diameter of the disc increases the peripheral speed thereof and the risk of thermal degradation also increases. If the capacity is to be increased materially, it has been necessary to take a different approach. Also, some difficulty has been encountered in obtaining uniform flow of unplasticized material to a single melt chamber from a single peripheral feed location.

According to the present invention, the extruder is provided with two shearing gaps, one on either side of a rotary disc, and material is fed to and through both gaps simultaneously. This increases the capacity of the extruder due to the extra melt chamber as compared to conventional, single chamber elastic melt extruders. Material may be taken away from the central portion of the rotor by a screw. By providing a decompression zone centrally of the rotor on one side thereof and by providing channels leading from the shearing gap on the other side of the rotor through the rotor to the decompression zone, it is possible to feed material from both gaps to the decompression zone and take material away from the decompression zone with a single screw.

It is, therefore, an object of the present invention to provide an elastic melt extruder having two shearing gaps which operate simultaneously so as to increase the output capaciy of the extruder.

Anoher object of the invention is to provide a dual gap elastic melt extruder with a single take-off screw to convey material away from the exit ends of the two shearing gaps.

A further object of the invention is to provide a method of extruding plastic material through two shearing gaps to a zone where the material undergoes decompression before it is conveyed away from the shearing gaps.

Another object of the invention is to provide a method of and apparatus for extruding plastic materials wherein two shearing gaps are provided on opposite sides of a single rotor and material passes from one gap to a zone on the other side of the rotor by passing through channels or openings provided in the central portion of the rotor, thereby allowing material to feed through both gaps to the central zone from which it is conveyed away by a screw.

Other objects of this invention will appear in the following description and appended claims, reference being had to the accompanying drawings forming a part of this specification wherein like reference characters designate corresponding parts in the several views.

Figure 2:
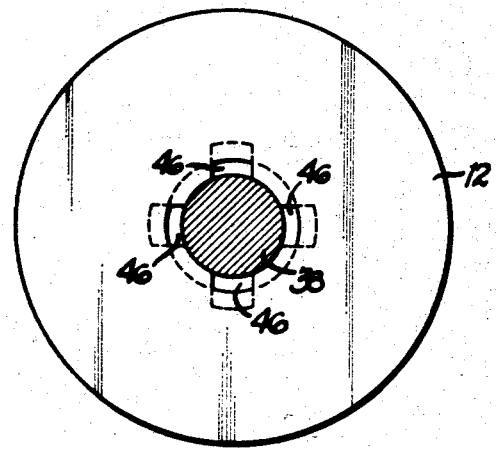

On the drawings:

FIGURE 1 is a vertical sectional view of a dual gap elastic melt extruder in accordance with the invention; and FIGURE 2 is a side elevation view of the rotor part of the elastic melt extruder of FIGURE 1.

Before explaining the present invention in detail, it is to be understood that the invention is not limited in its application to the details of construction and arrangement of parts illustrated in the accompanying drawings, since the invention is capable of other embodiments and of being practiced or carried out in various ways. Also, it is to be understood that the pharseology or terminology employed herein is for the purpose of description and not of limitation.

As shown on the drawings:

The extruder 10 includes a rotary disc 12 provided inside a suitable casing 14. The disc 12 has front and back faces 16 and 18 and a rim 20, and the casing 14 has radially extending interior surfaces 22 and 24 and a circumferential surface 26 which define with the disc two radially extending shearing gaps 28 and 30 on opposite sides of the disc. Particulate unplasticized thermoplastic material is fed into the two gaps 28 and 30 from a hopper 32 which communicates with the melt chambers at an opening 34 through the casing 14 peripherally of the disc 12. A shaft 36 is affixed at one end to the central portion 38 of the disc, and the shaft is rotated by power supplied from a motor 40 so as to rotate the disc and thereby impel the material from the feed opening 34 spirally inward through both shearing gaps 28 and 30 toward the central portion 38 of the disc.

The material is subjected to shearing stress as it passes through the gaps and the material becomes plasticized due to the "normal force" effect which is discussed in the article referred to previously. It is to be noted that material passes inwardly through both gaps simultaneously, thus providing an increase in capacity over extruders having only a single shearing gap.

The central portion 38 of the disc 12 has channels or apertures 46 extending through it, and these channels communicate at one end with shearing gap 28 and communicate at the other end with a central zone 48 on the other side of the disc. Zone 48, in turn, communicates with melt chamber 30 and also with the exit end of the channels. The zone 48 functions as a pressure relief zone and its dimension (measured axially of the disc 12) exceeds an effective visco-elastic gap dimension. Thus when the material reaches this zone, it undergoes decompression. Material also flows to zone 48 from chamber 28 by passing through the channels 46 while still under visco-elastic pressure from the chamber 28. Thus, material is fed to zone 48 from both chambers.

The material is conveyed away from zone 48 by an extruder screw 50 provided in a cylindrical barrel 52 which is coaxial with the disc 12 and communicates at one end with zone 48. The screw 50 has the usual helical flight 54 and is attached to the central portion 38 of disc 12 and so rotates along with the disc. Since both the screw 50 and the shaft 36 are affixed to disc 12, all of these parts rotate as a unit in response to the driving force supplied by motor 40.

If the decompression zone 48 were not provided in the apparatus, the back pressure of the material in the gap 30 near the central portion of disc 38 would prevent material from flowing from gap 28 through the channels 46. By providing the decompression zone 48, the material supplied from gap 30 to the zone 48 undergoes decompression there and allows material to flow from chamber 28 through channels 46 to the decompression zone such that the zone receives material from both gaps simultaneously. The material becomes pressurized again as it is advanced from zone 48 through barrel 52 by the extruder screw 50.

It is evident from the foregoing description that the invention allows material to be extruded through two shearing gaps simultaneously to thereby increase the capacity of an elastic melt extruder. By providing a decompression zone at one side of the rotor and channels extending through the rotor communicating with the decompression zone, material can flow from both gaps to the decompression zone and can be conveyed away from that zone by a single screw. Thus, although two gaps are employed, only one take-off screw is needed. The disc and the screw can be rotated by power supplied from a single drive unit through a drive shaft affixed at one end to the rotor, and this simplifies the construction as compared to extruders where the rotor and the take-off screw each have their own drive.

I claim:

1. An extruder comprising a disc having opposite faces, means defining surfaces closely spaced from said disc faces and defining therewith first and second shearing gaps on opposite sides, respectively, of said disc, means to feed unplasticized thermoplastic material to said shearing gaps, drive means for relatively rotating said disc and said surfaces to subject said material in said gaps, respectively, to shearing stress, the material being impelled spirally inward through said gaps toward the central portion of said disc, said central portion having channels extending transversely through said disc for flow of material from said first gap through said disc to the other side thereof, and means at said other side of said disc for advancing material away from both of said gaps.

2. The extruder of claim 1 wherein said advancing means comprises a barrel having an enlarged zone at one end thereof communicating there with said channels and said second shearing gap, and a screw in said barrel rotatable to advance material from said zone to an outlet.

3. The extruder of claim 2 wherein said zone has a dimension axially of said disc greater than an effective visco-elastic gap such that decompression of material takes place in said zone.

4. The extruder of claim 3 wherein said screw is affixed to said central portion of said disc and is therefore rotated with said disc by said drive means.

5. An extruder comprising a disc having opposite faces and a rim, casing means having surfaces closely spaced from said faces of said disc defining therewith two shearing gaps substantially parallel to each other and extending respectively along said opposite faces of said disc, means to feed unplasticized thermoplastic material to said gaps peripherally of said disc, drive means for rotating said disc to impel material from said feed means centripetally through both of said shearing gaps toward the center of said disc, channels extending through said disc centrally thereof, a barrel communicating at one end thereof with one of said shearing gaps at a central portion of said disc, and a screw in said barrel affixed to said central portion of said disc and rotatable by said drive means to advance material away from said gaps, said screw and said casing means forming a decompression zone centrally of said disc communicating with said channels at one side of said disc whereby material may pass through said channels from the shearing gap on the other side of said disc to said decompression zone and material may also flow to said decompression zone from the shearing gap on said one side of said disc, said screw and said barrel providing a single outlet path from said decompression zone.

6. A method of extruding plastic material employing a rotor having opposite faces, and means having surfaces closely spaced from said faces defining therewith first and second searing gaps extending respectively along said faces on opposite sides of said rotor, said method comprising the steps of supplying unplasticized material to said shearing gaps peripherally of said rotor, rotating said rotor to advance the material inwardly of said rotor through said shearing gaps while subjecting the material to shearing stress in said gaps to plasticize the material at a predetermined pressure, reducing the pressure at a central region of said second gap, passing material from said first gap at said predetermined pressure through said central portion of said rotor into said reduced pressure region, and removing from said region material introduced into said region from both of said gaps.

7. The method of claim 6 wherein the step of advancing material away from said rotor is carried out with a rotating screw.

8. The method of claim 7 wherein said screw and said rotor are rotated together by a single drive means.

9. A method of extruding plastic material employing a rotary disc having opposite faces and means having surfaces closely spaced from said faces defining therewith first and second shearing gaps extending respectively along said faces, said method comprising the steps of supplying unplasticized material to said gaps peripherally of said disc, rotating said disc to impel material spirally inward through both of said gaps to a central portion of said disc to thereby plasticize the material at a predetermined pressure, passing material from said first gap through channels extending through said central portion of said disc to a zone of reduced pressure on the opposite side of said disc communicating with said second shearing gap, the material supplied to said zone from said first and second shearing gaps undergoing decompression in said zone, and advancing material away from said zone.

References Cited
UNITED STATES PATENTS 2,977,632 4/1961 Bunch _____ 18—12
3,032,814 5/1962 Miner _____ 18—12

FOREIGN PATENTS 1,079,816 8/1967 Great Britain.

JULIUS FROME, *Primary Examiner.*

A. H. KOECKERT, *Assistant Examiner.*

U.S. Cl. X.R.

264—176; 18—12